Feb. 16, 1932.  A. BONOM  1,845,955
TURBINE
Filed July 23, 1927  6 Sheets-Sheet 1

Inventor
Alfred Bonom
Attorneys

Inventor
Alfred Bonom
By
Attorneys

Feb. 16, 1932.        A. BONOM        1,845,955
TURBINE
Filed July 23, 1927      6 Sheets-Sheet 4
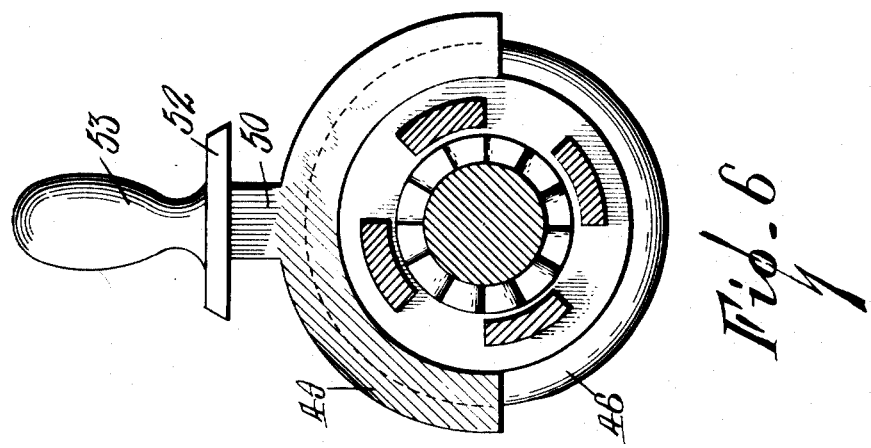
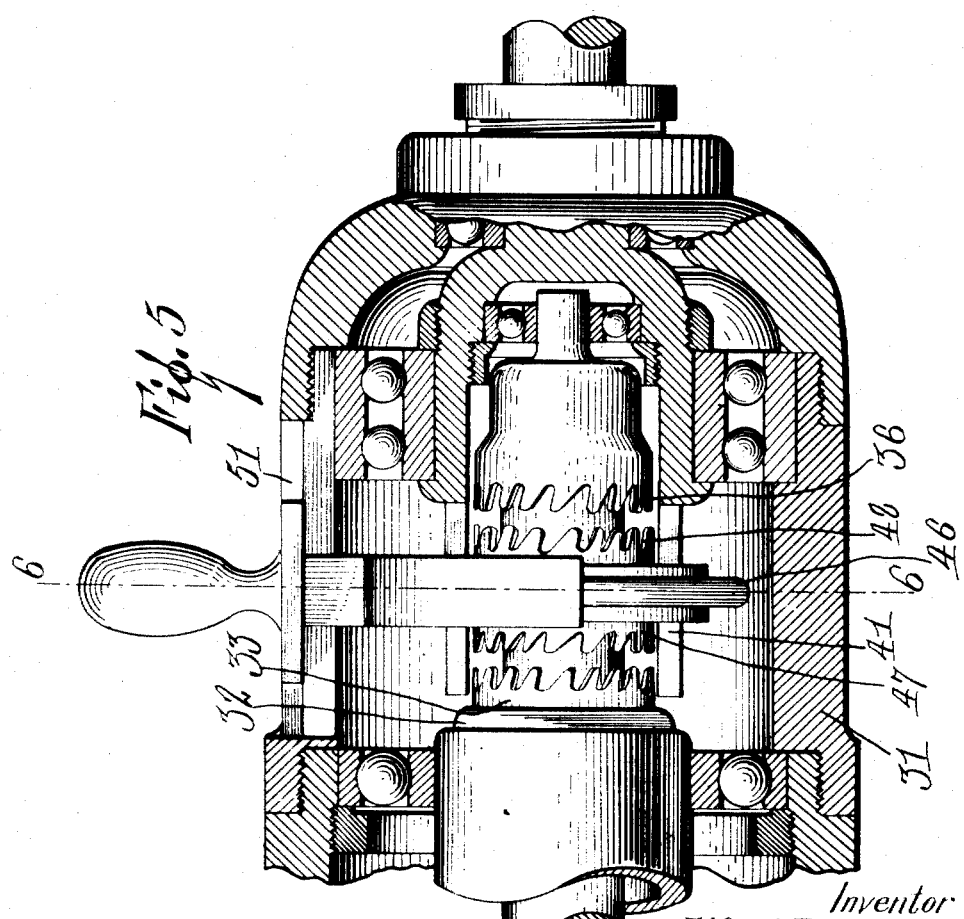
Inventor
Alfred Bonom
By Marion Marion
Attorneys

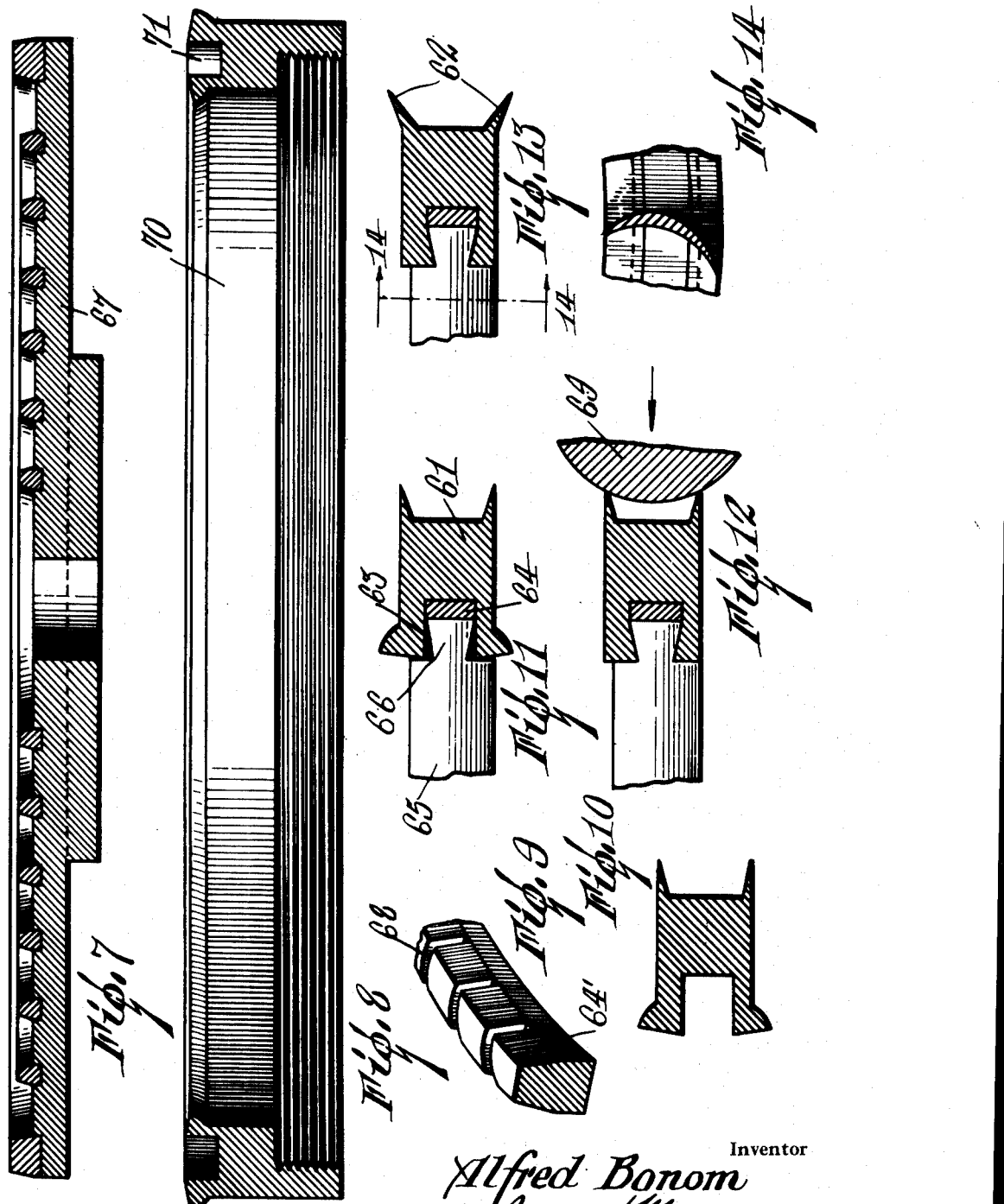

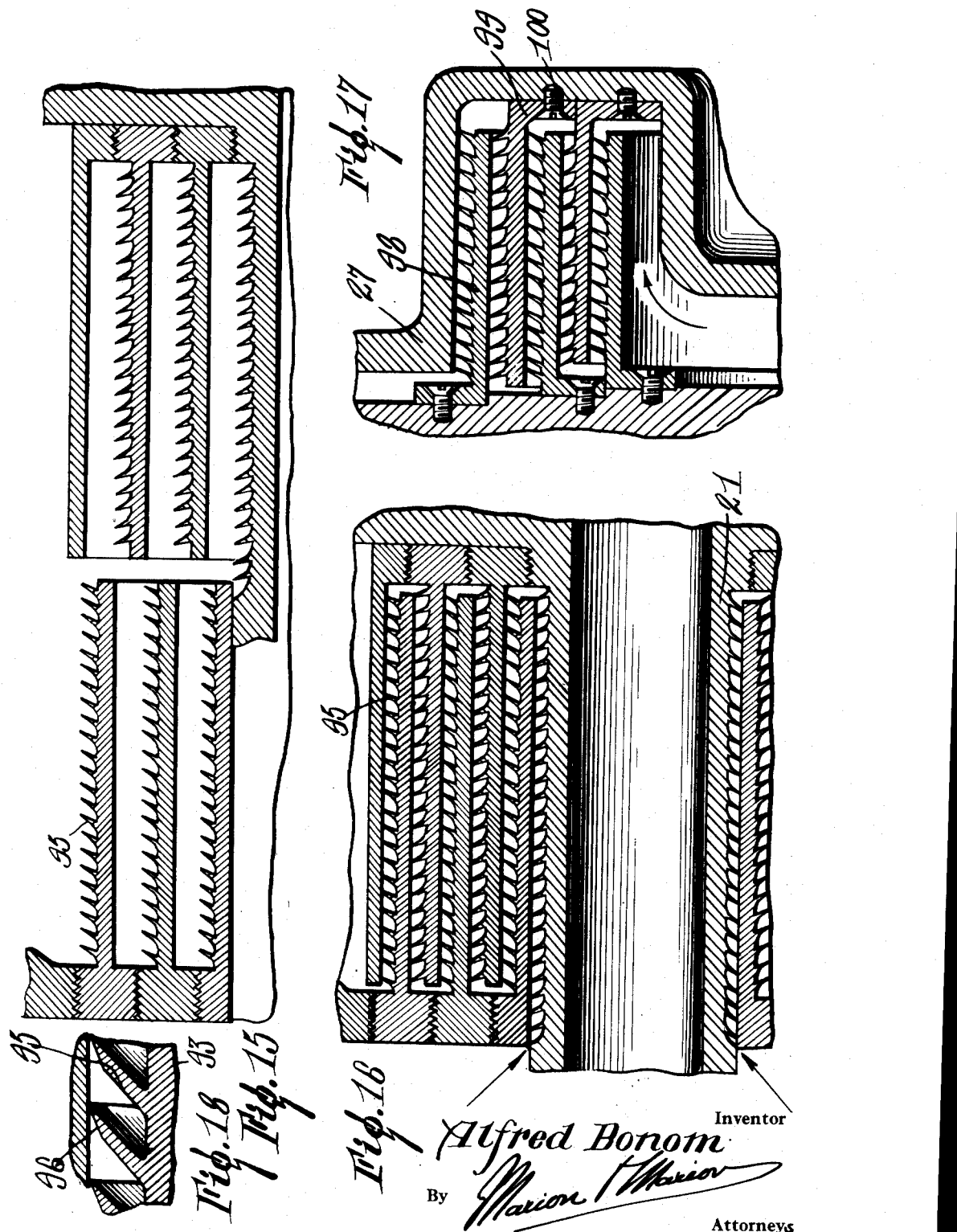

Patented Feb. 16, 1932

1,845,955

UNITED STATES PATENT OFFICE

ALFRED BONOM, OF MONDOVI, ITALY

TURBINE

Application filed July 23, 1927. Serial No. 207,907.

The present invention relates to improvements in fluid turbines and more specifically to steam turbines of the radial type.

The principal object of this invention is the provision of a turbine simple in character, of easy construction, economical in operation, compact, light and of high efficiency.

The turbine, object of this invention, comprises two rotors (one corresponds to the rotor and the other to the distributor of the usual turbines) the concentric shafts of which are connected together, at one end, by means of a differential mechanism, and are provided at the other end with clutching means whereby said shafts can be alternatively connected to a third shaft, hereafter called the driving shaft.

By this arrangement, the driving shaft can be made to run at will either in one or the other direction by clutching it through suitable means to either one or the other rotor.

The rotor not connected to the driving shaft can be left idle or free and then the said driving shaft will revolve at half the speed of relative rotors speed.

The principal characteristic of this invention resides in the fact that all the organs comprising the turbine (casing, rotors, blades, baffles, differential, clutch, etc.) are simply assembled by screwing along and concentrically with the turbine axis, so as to considerably simplify the turbine assembly; the different operations of assembling, dismantling and adjusting can be quickly and simply done.

The drawings herewith attached show as an example, one form of construction of a reversible turbine in which the two rotors can revolve freely in opposed directions.

Figure 5 is a detail section of the reversing clutch, parts being shown in elevation.

Figure 6 is a section along line 6—6 of Figure 5.

Figure 7 is a diametrical section of a mandrel in which the rotor blades supporting rings are mounted for grooving.

Figure 8 is a diametrical section of one of the outside rotor blade supports.

Figure 9 is a fragmentary perspective view of one of the rotor blade supporting rings.

Figure 10 is a radial section of one of the ring supporting members.

Figure 11 is a similar section showing in elevation a rotor blade inserted in the ring.

Figure 12 is a similar section showing the supporting member crimped against the blade.

Figure 13 is a similar section showing the prongs of the supporting member after having been spread.

Figure 14 is a section on the line 14—14 of Figure 13.

Figure 15 is a detail longitudinal section showing the labyrinth packing prior to assembly.

Figure 16 is a similar section showing the packing assembled.

Figure 17 is a similar section of a modified construction; and

Figure 18 is an enlarged detail of the packing.

Reference to these views will now be made by means of like characters which are employed to designate corresponding parts throughout.

Figure 1:
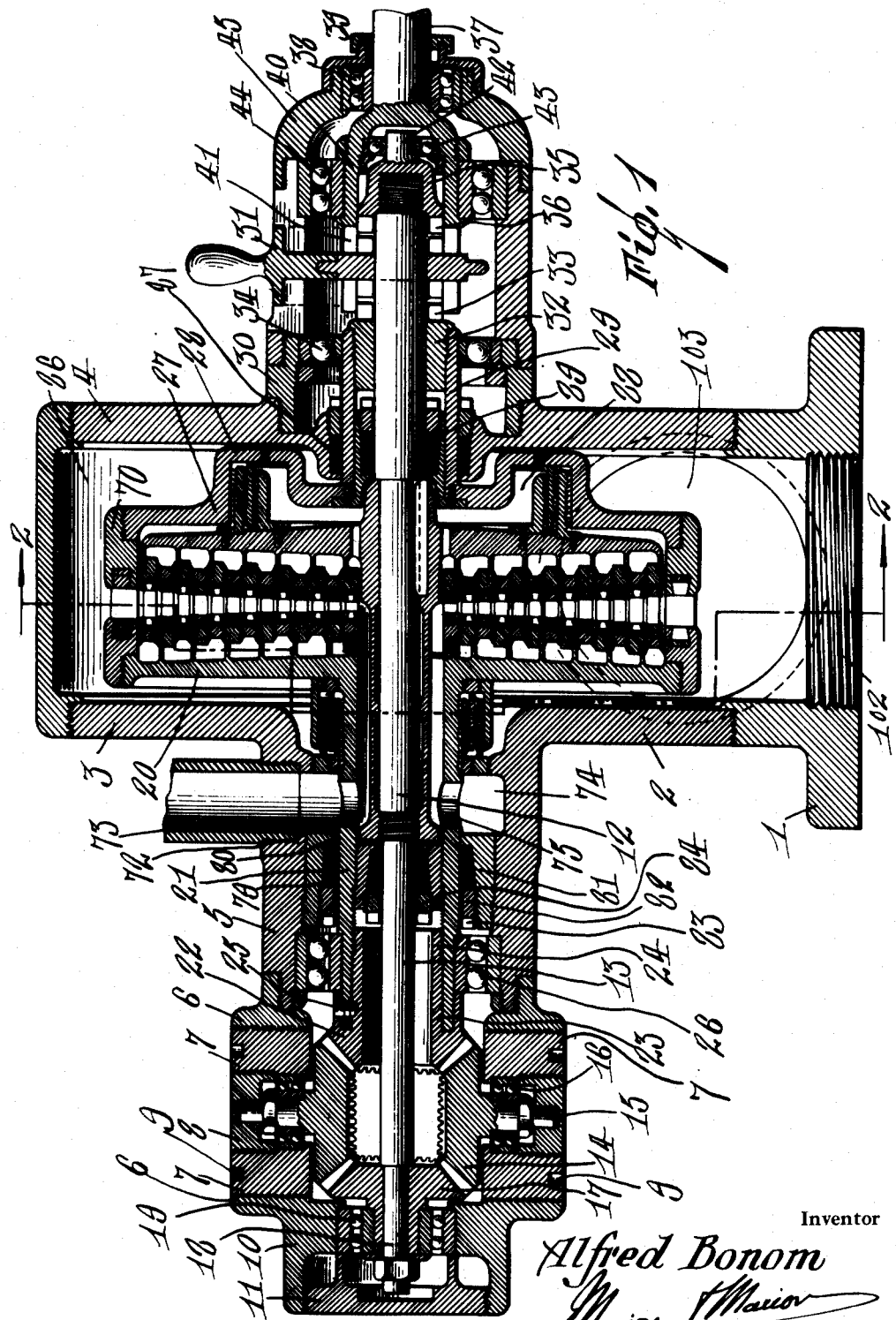
Figure 1 is a longitudinal vertical section of the turbine.
Figure 2:
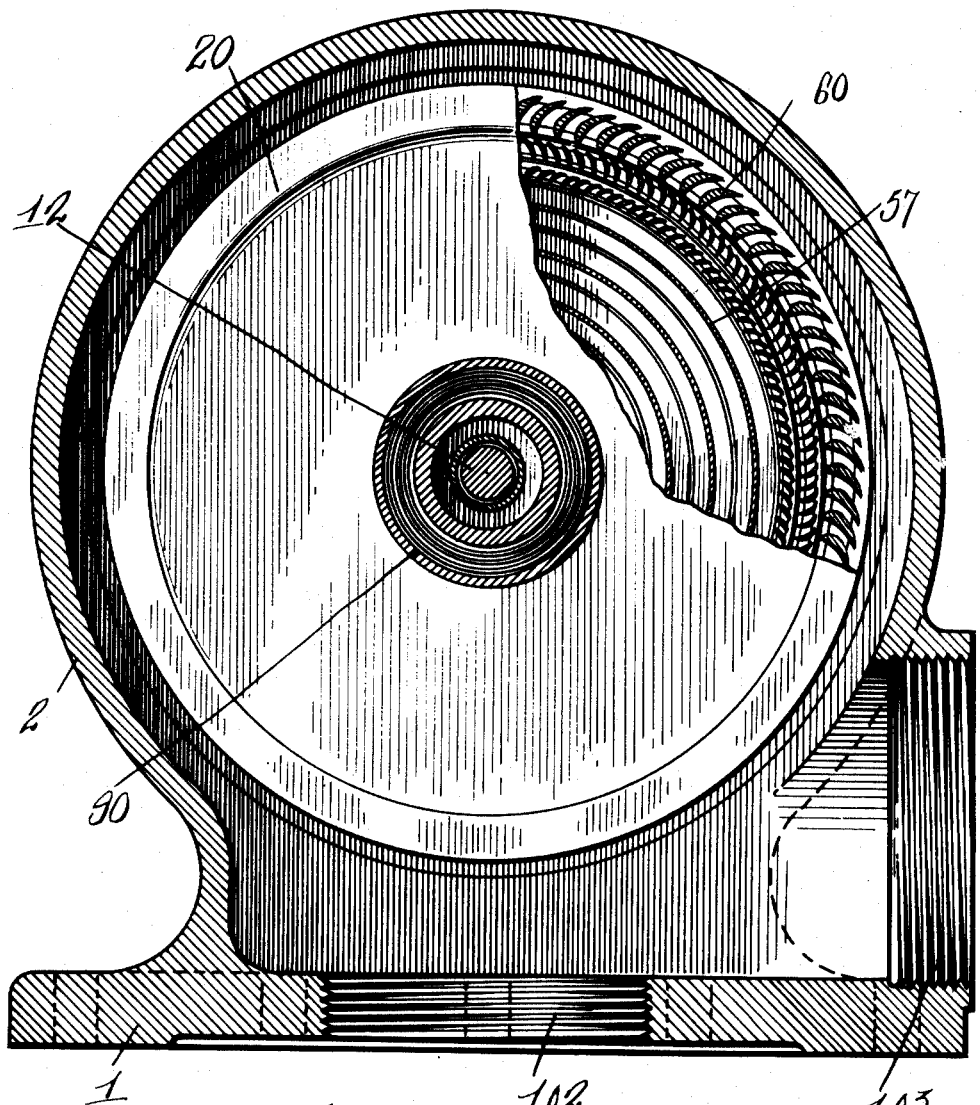
Figure 2 is a section along line 2—2 of Figure 1.
Figures 3, 4:
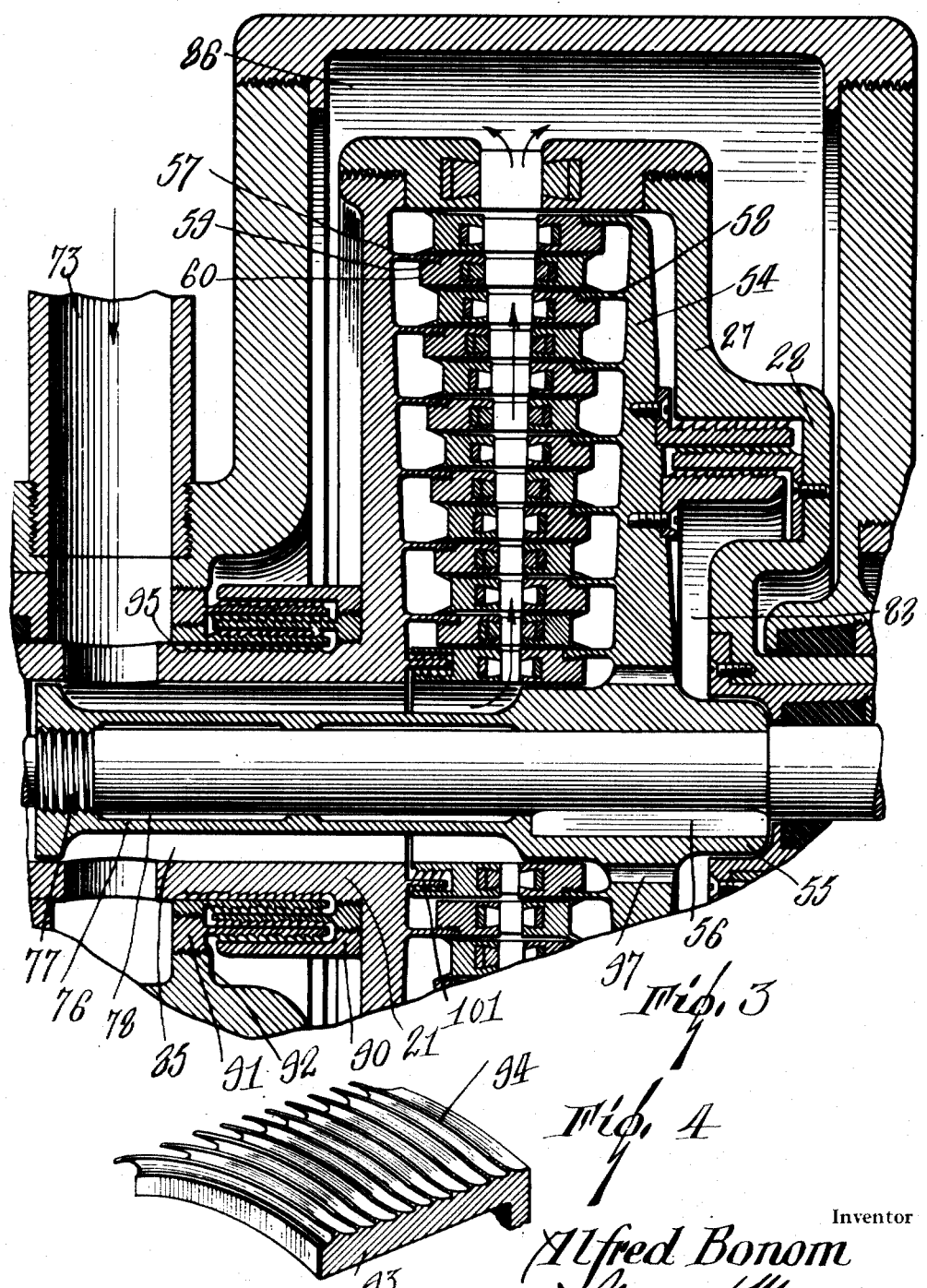
Figure 3 is an enlarged fragmentary view of section in Figure 1.
Figure 4 is a perspective view of a fragment of the novel labyrinth packing.

As shown more clearly in Figures 1 and 2, the frame of the machine comprises a base 1 on which is built a cylindrical casing 2 closed by separable lateral covers 3, 4 screwed to the base.

The cover 3 is extended laterally in the form of a sleeve 5 upon the free end of which is screwed a ring 6.

Collars 7 are threaded radially into the ring and bearing pieces 8 into the collars.

Finally, the outer end of the collar 6 is formed with an end sleeve 10 into which is screwed a bearing ring 11.

Inside casing 2, revolving in opposite directions, are mounted the two rotors of the turbine. One of those rotors, hereinafter called "inner rotor", comprises a blade-disk or plate 54 the hub 55 of which is locked by a key 56, directly on a central shaft 12 prolonged as at 13 and axially extending through the sleeve 5 and ring 6, and bears at its extremity a planetary wheel 17 the hub of which is supported by sleeve 10 through ball-bearings 19.

The other rotor or "outer rotor" comprises a blade bearing plate 20 the hub 21 of which surrounds the shaft 12 and its extension 13, and bears the planetary wheel 22 disposed opposite wheel 17, the hub 23 of which is screwed onto hub 21 at 24 and further locked by set screw 25. Hub 21 is supported unto sleeve 5 by means of ball-bearings 26.

The planetary wheels 17 and 22 mesh with pinions 14, the shafts 15 of which are journaled in bearings 8 through ball-bearings 16.

Each collar 7 is provided with a series of notches 9 to receive a special tool when adjusting the perfect meshing of pinions and planetary gears, by screwing more or less the collar 7.

The outer rotor comprises also a disk 27 having a circular projection 28 and a hub 29 which extends outside through a central hole of cover 4, and forms with hub 21 of plate 20, the hollow shaft of outer rotor.

On the outer face of cover 4, is screwed a ring 30, unto which is screwed in turn a clutch 31 receiving also the shaft 12 surrounded by clutch member 32 provided with teeth 33, and threaded into the end of hub 29, which is supported by means of ball-bearings unto ring 30. (Figure 5.) To this end of shaft 12 is screwed the other clutch member 35 provided with teeth 36.

The casing 31 is closed by a cover 45 threaded unto its free end, and supports through a ball-bearing 38 and flange 39 the driving shaft 37, the cupped inside extremity 40 of which holds the clutching element 35 and is provided with elongated finger shaped projections 41 extending over teeth 33.

Between the clutching element pivot 42 and the cup 40 a ball-bearing is placed, and between cup 40 and casing 31 a ball-bearing is also to be found.

In Figures 5 and 6, there is, mounted on the shaft 12, and loose between surfaces 33 and 36, the movable clutching element consisting of a ring 46 laterally provided with teeth 47 and 48 intended to engage with surfaces 33 and 36 respectively.

The ring 46 can revolve freely into the slot of a sector 49 which sector can be displaced axially but not angularly, being fixed to a beveled slider 52 by means of a stem 50.

The slider 52 engages an axial slot 51 into the body 31, and is provided with a handle 53 to effectuate the clutching.

The plates 20 and 54 are provided of thin cylindrical ribs 57 and 58 concentrically to the shaft 12 and internally threaded as at 59.

Unto the ribs 57 and 58 are threaded the main crowns 60 supporting the circular series of blades, which blades are connected at their extremities and maintained in place by circular end crowns 61 provided with a pair of circular ribs 62. When assembled, those ribs are slightly divergent to lightly bear, frictionally, on the cylindrical inner surfaces of the main adjacent crown 60 and the adjacent thin rib 57 or 58 respectively.

The length of the concentric circular series of blades is varied in a strict ratio, increasing from the centre towards the periphery; this variation is arrived at by making the internal faces of the plates 20 and 54 divergent towards the outside. The construction of the different assembly organs are thus simplified, due to the fact that all the parts are then absolutely identical for all the series of blades.

The main and end crowns 60 and 61 respectively are provided on their inner face, with a circular notch 63 (Figures 10 and 11). Into those notches are disposed the spacing rings 64.

As clearly shown in Figures 11, 12 and 15 each blade 65 is provided at its end with a dovetail-shaped tenon 66 engaged into the ring 64. To this end, a special machine making the subject matter of another patent application under the same name which is used to cut the separating rings 64 from a disk 67, after a series of arcuate notches 68 have been cut therein, to receive the dovetail tenons 66.

After the tenons 66 have been inserted into the notches 68, the crowns together with the rings and blades are placed in a convenient crimping machine to crimp the sides 63 of the notches directly onto the tenons; said tenons being then held firmly in place inside a dovetailed notch limited by their inclined faces and sides 64' of the ring 64. This is illustrated in Figures 12 and 13.

As illustrated in Figures 10, 11 and 12, the circular sides 62 are perpendicularly disposed relatively to the cylindrical face of the main crown 61, and they are successively outwardly separated or inclined by means of a convenient tool or machine 69 applied against the ribs, as shown in Figure 13.

The plates 20 and 27 of the outer rotor are interconnected by means of rings 70 threaded into the cylindrical surface of said plates and bearing the external circular series of blades. To this end, each of the blades is provided on its inner surface with a parallel-walled groove 71 adapted to receive the separating rings; fixed as described herebefore when mention was made of crowns 60 and 61.

The sleeve 5 is provided with openings 72 to which the steam inlet tube 73 is attached. The steam is admitted through this tube or pipe, fills the annular space 74 between the sleeve 5 and hub 21 and enters at the center of rotors through the openings 75 provided for that purpose into the hub 21.

To insulate the shaft 12 from the contact of super-heated steam, the hub 55 of plate 54 is provided with a tubular insulating projection 76 surrounding the central part of shaft 12 and conveniently spaced from it; said tube being threaded at 77 immediately under the steam inlet pipe 73.

The space 78 between the projection 76 and shaft 12 offers a most excellent insulation for the last. A convenient packing adjacent to the inlet openings prevents the steam leaks through the revoluble parts.

This packing comprises a ring 79 threaded into the sleeve 5 and provided towards the inside with a wall 80 projecting towards the core 21 near the opening 75. Between the hub 21 and ring 79 is inserted a packing 81 held by the wall 80 against which it is held by an inner collar 82 threaded on to the element 79, and provided with teeth 83 for proper adjustment by means of a suitable tool.

A similar packing, shown at 84 (Figure 1), has for its purpose the prevention of steam leaks through the annular space 85, between hub 21 and extension 76 of shaft 12, towards the differential.

The clutch casing 31 is insulated from the exhaust chamber 86 by means of a packing 87 disposed between hub 29 and cover 4. A packing 89 is also inserted between hub and shaft 12 and is used to tightly close chamber 88, formed by plate 27, to equalize the pressure against plate 51.

The steam leaks from the inlet 73 towards the exhaust chamber 86, are prevented by a special labyrinth packing or baffle illustrated in detail at Figures 3, 15, 16, 17 and 18.

On the hub 21 rings 90 are threaded in close proximity to plate 20, and similar rings are screwed unto a thin radial rib of the inner surface of sleeve 5, in such a way as to make a wall between the inlet chamber 74 and the inside of the rotors casing.

Cylindrical projections 93 (Figure 4) are attached to the rings, concentrically with ring projections 90 alternating with those of rings 91; said projections are completed on the outer surface by a series of circular parallel ribs 94 inclined against the stream of steam, and so shaped as to co-operate with the cylindrical surface of the adjacent projection. The hub 21 bears also on its outer surface circular ribs completing the packing.

Preferably, the angle between the sides and cylindrical ribs is about 45°; each element being composed of a metallic cylinder on the surface of which a series of U-shaped grooves are provided, and inclined by a suitable tool; the ridge of said rib being also bevelled at 96 by means of any convenient tool. (Figure 18).

The size of the labyrinth packing elements is such, that when assembled, the bevelled ridges contact with the inner surfaces of the next element.

If then, the turbine is rotated by some auxiliary means, the wear of ridges 96 leave a very slight space between said ridges and the cylindrical surfaces with the result that the steam coming from chamber 74 has to follow a rather sinuous path, expanding at each groove of the packing and losing all its pressure when through its travel in the packing.

As precedently indicated, the chamber 88 is provided into the inner surface of plate 27 to equalize the action of plate 54 since it is evident that the inner face of plate 54 is under the pressure of the live steam.

To prevent the live steam from escaping from compensating chamber 88 into exhaust chamber 86, another labyrinth packing is provided (Figure 17) the elements 90 of which are fixed into the circular projection 28 of plate 27, and elements 98 to plate 54. The elements 98 and 99 are provided with elbows screwed alternatively to plate 54 and projection 28.

The kind of packing shown in Figures 15 and 16, comprising the threaded rings 90 and 91 provided with rather long extensions, is preferable when space long axially and narrow radially is available; the shape shown in Figure 17 comprising elbows and relatively short cylindrical surfaces is more conveniently adaptable when the available space is short axially and high radially. A labyrinth packing 101 placed between the plate 20 and end crown of the first circular series of blades of plate 54, prevents the steam from escaping from chamber 85 through said space.

The base 1 and casing 2 are both provided with exhausts 102 and 103 respectively that can be used indifferently.

If the rotor 54 revolves in a clockwise direction, the rotor plates 20 and 27 revolve in the opposite direction; the inner rotor rotates the shaft 12 in a clockwise direction through the hub 55. The plate 20 of outer rotor revolving in a counter-clockwise direction carries the planetary wheel 22 which transmits the rotation in an opposed direction to wheel 17 through the pinions 14. The gear or wheel born by extension 13 drives also the shaft 12 now running in a clockwise direction.

The rotation of shaft 12 is transmitted to driving shaft 37 by working the handle 53 so as to mesh teeth 36 and 48. If the handle is pushed the other way to mesh teeth 33 and 47, the driving shaft is made to revolve the opposite way.

Having thus fully described the invention, what I claim as new and desire to protect by Letters Patent is:

1. In a steam turbine wherein the following elements are screw-threaded concentrically into one another longitudinally: annular casing, casing side walls, tubular bearing elements threaded in the side walls, collars threaded in the tubular elements adapted to hold ball-bearings against abutments, members at both ends of the turbine to secure ball-bearings, and clutch means threaded at one end of the turbine main shaft, a main shaft, a rotor screw-threaded unto said shaft, a second rotor surrounding the shaft, and adapted to turn oppositely to the first rotor, and gearing connecting the two rotors, the combination therewith of a propeller shaft adjacent said main shaft and in line therewith, a clutch member slidable over the main shaft and having a plurality of curved fingers on both clutching faces thereof, fingers on the main shaft adapted to engage that of the clutching members, means connecting the said member to the propeller shaft, and means to slidably actuate the clutching member over the main shaft and in and out of engagement with the main shaft.

2. In a steam turbine wherein the following elements are screw-threaded concentrically into one another longitudinally: annular casing, casing side walls, tubular bearing elements threaded in the side walls, collars threaded in the tubular elements adapted to hold ball-bearings against abutments, members at both ends of the turbine to secure ball-bearings, and clutch means threaded at one end of the turbine main shaft, a main shaft, a rotor screw-threaded unto said shaft, a second rotor surrounding the shaft, and adapted to turn oppositely to the first rotor, gearing connecting the first tube with the shaft, and a propeller shaft adjacent to and in line with the main shaft, the combination therewith of a clutching member slidable over the main shaft, curved fingers on both clutching faces of said member, a semi-circular fork wherein the said member is adapted to revolve, bars secured to the propeller shaft and adapted to enter apertures provided in the clutching member whereby the member will rotate with the propeller shaft, clutching fingers on the main shaft to engage that of the clutching member, similar fingers on the stub tube, and manual means for engaging the clutching member with either or none of said fingers on the shaft and tube.

3. In a steam turbine, rotors adapted to revolve in opposite directions, a shaft connected to each of said rotors, gearing between said shafts, and clutching means whereby a third shaft may be rotated in forward or reverse direction, the turbine being further characterized by the fact that the component parts thereof comprise an annular casing, side walls threaded in said casing, tubular bearing extensions threaded into the side walls, end caps threaded at both ends of the extensions to secure shaft ball-bearings, collars threaded inside the extensions to hold the main shaft ball-bearings, first rotor threaded on the main shaft, second rotor threaded unto one gear of the rotors gearing, and a member threaded into the second rotor, surrounding both rotors and acting as a labyrinth packing and threaded to a bushing on the main shaft, said above elements of the turbing being threadedly secured together concentrically around the axis of the turbine.

4. In a steam turbine wherein most of its elements are threaded into one another axially, an annular casing, side walls threaded in the casing to form a rotor chamber, tubular bearing members screw-threaded in the side walls concentrically of the annular casing, ball-bearings inside said tubular members, end-caps threaded in said members and engaging the ball-bearings against an abutment of the tubular members, a main shaft journalled in the ball-bearings, a rotor screw-threaded on said shaft, a second rotor surrounding the shaft, and a gear-train between the two rotors to one gear of which the second rotor is threadedly engaged, the combination therewith of clutching means concentric with the shaft and embodying clutching means having fingers and a member for shifting said clutching means.

In witness whereof I have hereunto set my hand.

ALFRED BONOM.